(12) United States Patent
Lu

(10) Patent No.: US 6,748,625 B2
(45) Date of Patent: Jun. 15, 2004

(54) NOTEBOOK COMPUTER HINGE WITH SPRING OPENER

(75) Inventor: Sheng-Nan Lu, Taipei Hsien (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 30 days.

(21) Appl. No.: 10/291,696

(22) Filed: Nov. 12, 2002

(65) Prior Publication Data

US 2004/0088825 A1 May 13, 2004

(51) Int. Cl.[7] .............................. E01F 1/14; E05D 11/06
(52) U.S. Cl. .............................. 16/285; 16/289; 16/290; 16/374; 248/917; 248/919; 248/923; 361/681
(58) Field of Search .......................... 16/285, 289, 290, 16/307, 308, 374; 248/573, 917, 919, 922, 923; 361/681, 682

(56) References Cited

U.S. PATENT DOCUMENTS

| | | | | | |
|---|---|---|---|---|---|
| 3,905,065 A | * | 9/1975 | Seeger et al. | ................. | 16/317 |
| 4,215,449 A | * | 8/1980 | Loikitz | ........................... | 16/50 |
| 5,109,570 A | * | 5/1992 | Okada et al. | .................. | 16/289 |
| 5,383,253 A | * | 1/1995 | Lin | ................................ | 16/54 |
| 5,600,868 A | * | 2/1997 | Tourville et al. | ............. | 16/277 |
| 5,873,847 A | * | 2/1999 | Bennett et al. | ................ | 602/16 |
| 5,894,633 A | * | 4/1999 | Kaneko | ........................ | 16/306 |
| 6,553,625 B2 | * | 4/2003 | Lin et al. | ...................... | 16/342 |
| 6,671,929 B1 | * | 1/2004 | Lu | ................................ | 16/342 |

* cited by examiner

Primary Examiner—Gary S. Hartmann
(74) Attorney, Agent, or Firm—Troxell Law Office PLLC

(57) ABSTRACT

A notebook computer hinge with spring opener is provided. The shaft has a C-shaped stopper ring with an offset notch in the middle section, which allows the coupling block of the rotatable bracket to be engaged by the notch. A spring is mounted on the outer edge of the rotatable bracket through a common shaft. As the display panel is lowered towards the computer body, the coupling block presses against the stopper ring and a torsional force is accumulated by the spring. The force will be released once the notebook computer is opened, enabling the display panel to be separated from the computer body with an appropriate angle, thus providing extra convenience for notebook computer users.

3 Claims, 8 Drawing Sheets

NOTEBOOK COMPUTER HINGE WITH SPRING OPENER

BACKGROUND OF THE INVENTION

1. Field of the Invention

The present invention relates to a notebook computer hinge with spring opener, in particular to a hinge mechanism connecting the display panel and the notebook computer body that enables the display panel to be released from the notebook computer body with an appropriate angle.

2. Description of Related Arts

Slim body design, portability and operatibility are some of the most important user requirements for notebook computers. To save working space, the display panels of notebook computers have adopted a foldable design. A hinge mechanism is commonly used to rotatably connect the display panel and the notebook computer body. A locking device is used to bind the display panel and the computer body together when the computer is closed.

There is usually no gap between the display panel and computer body in the closed position. When the user wants to turn on the notebook computer, he or she has to use the fingers of one hand to push up the display panel while pressing down the release of the locking device with the other hand. This kind of coordinated action in order to open up the notebook computer and set up the display panel is rather inconvenient for ordinary users.

The present invention is to address these problems in the conventional hinge of notebook computers.

SUMMARY OF THE INVENTION

The main object of the present invention is to provide a modified design for the hinge mechanism having a spring opener that enables the display panel to be automatically separated from the notebook computer body when a user opens up the notebook computer.

The hinge mechanism with spring opener comprises a rotatable bracket, a fixed bracket, a shaft inserted through the aperture on the rotatable and fixed brackets.

The shaft has a stopper ring in the middle section, whereby the rotatable bracket and the fixed bracket are respectively installed on the left side and the right side thereof.

The rotatable bracket and the fixed bracket both have a tube integrated on a planar portion.

The rotatable bracket has an angular corner with a hole for anchoring one leg of the spring.

The rotatable bracket also has a coupling block at one end of the tube to be lodged in the offset notch of C-shape stopper ring in the middle section of the shaft when the bracket is slid over the shaft.

The rotatable bracket and the spring are installed by inserting one end of the shaft through the tube of the rotatable bracket and the hollow center of the spring. The fixed bracket is installed by inserting the other end of the shaft through the tube of the fixed bracket.

The rotatable bracket has a coupling block at one end of the tube to be lodged against the offset notch of C-shape stopper ring in the middle section of the shaft when the bracket is slid over the shaft.

The spring is mounted on one end of the rotatable bracket as opposed to the fixed bracket, having one leg fixed on the angular corner of the rotatable bracket and the other leg between the clamps at the end of the shaft.

The features and structure of the present invention will be more clearly understood when taken in conjunction with the accompanying figures.

DETAILED DESCRIPTION OF THE PREFERRED EMBODIMENT

An embodiment of the present invention, applied to a notebook computer, will hereinafter be described in reference to the drawings.

Figure 1:
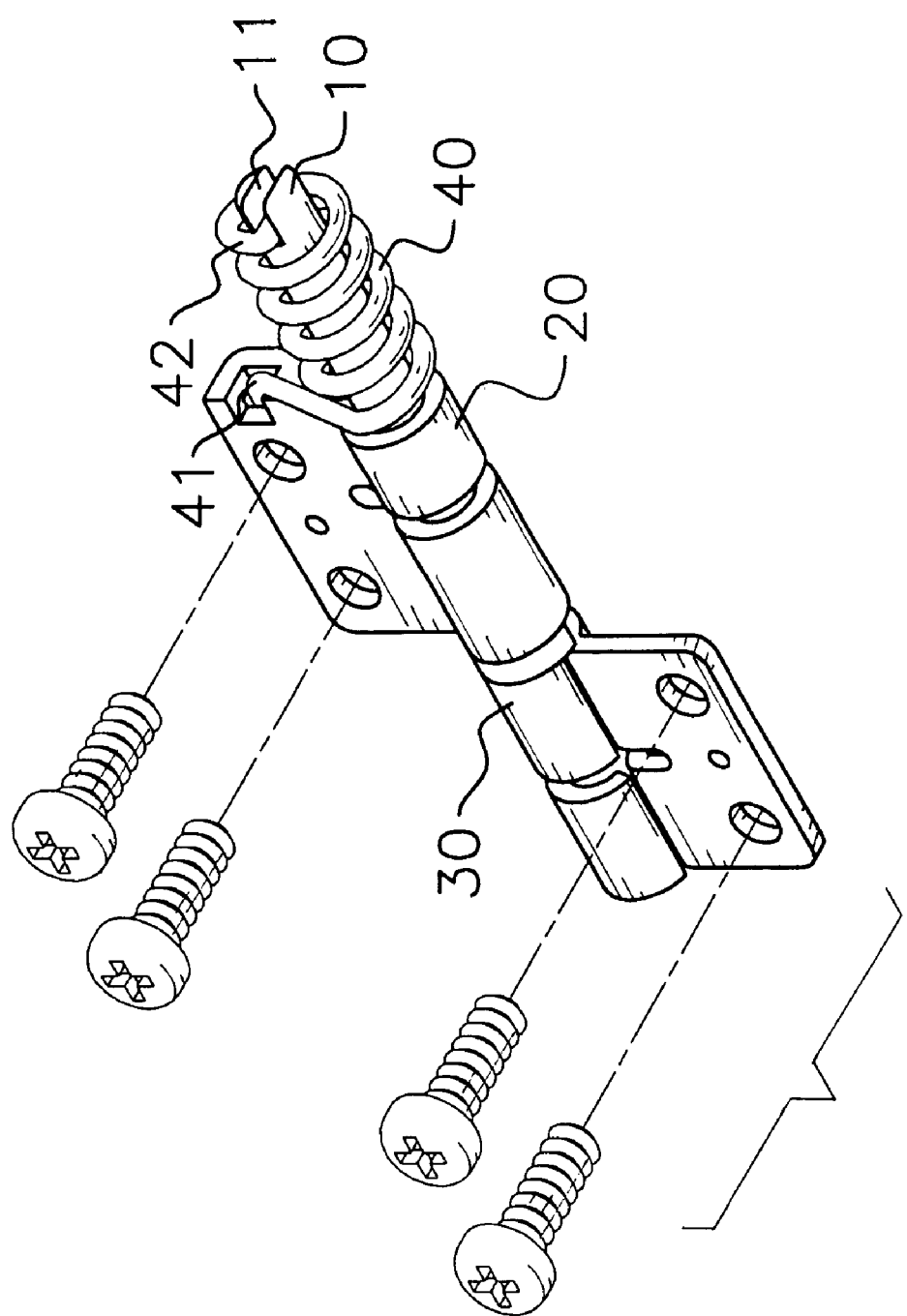
FIG. 1 is a perspective view of the present invention.

With reference to FIG. 1, the structure of the hinge mechanism comprises a shaft (10), a rotatable bracket (20), and a fixed bracket (30), and a spring (40).

Figure 2:
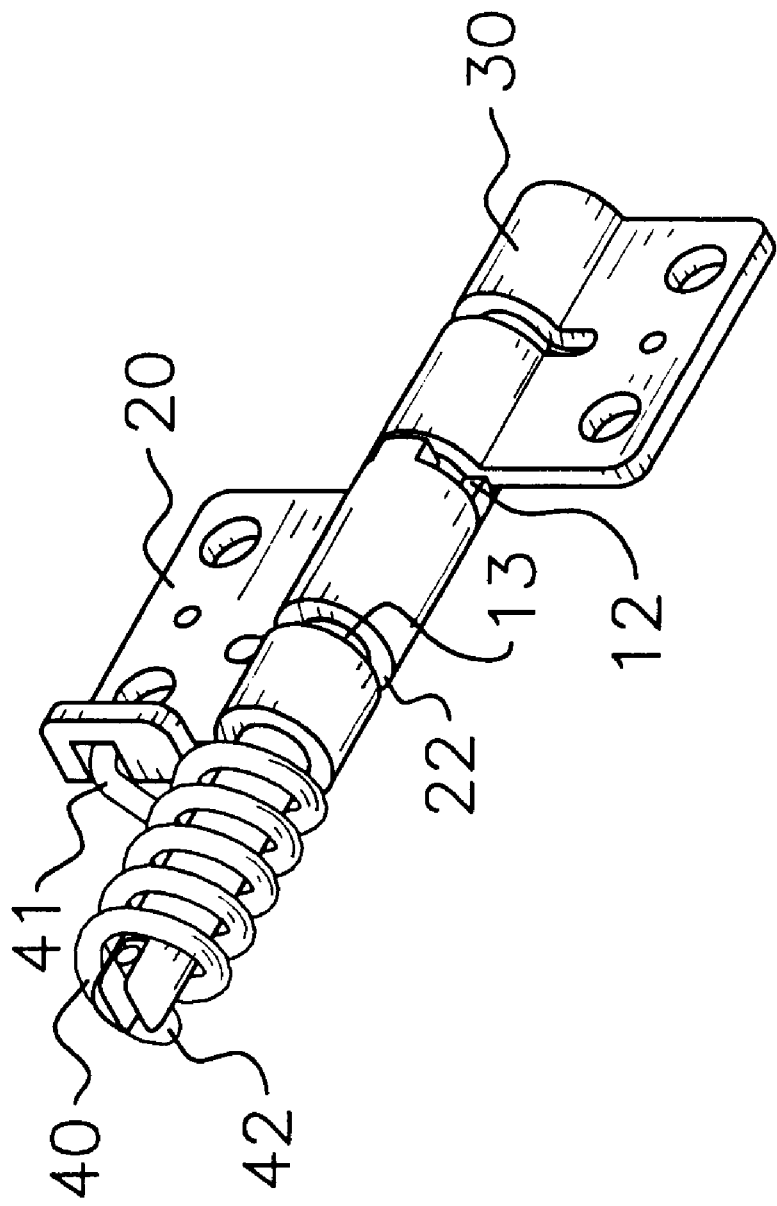
FIG. 2 is a view of the present invention from a different angle.
Figure 3:
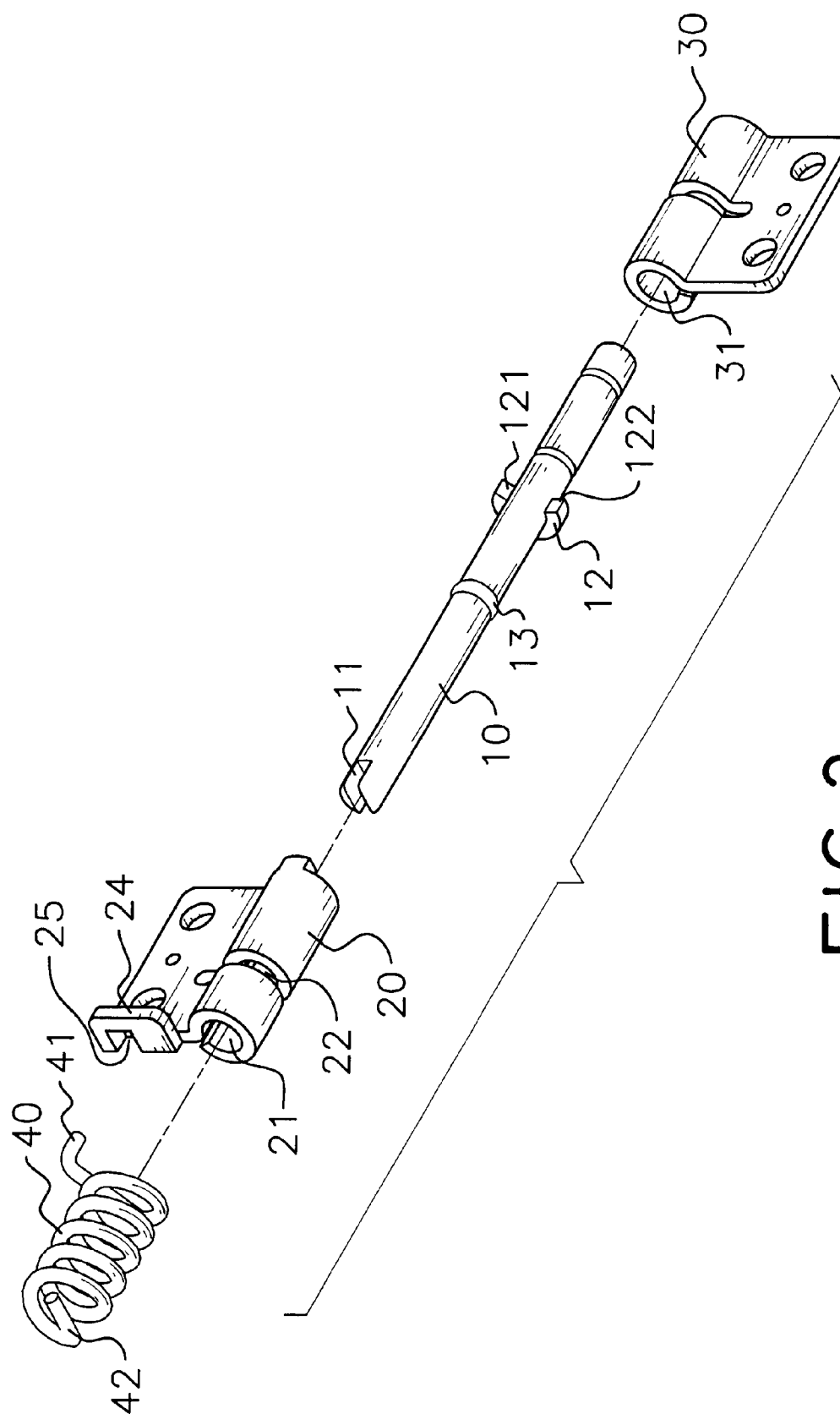
FIG. 3 is an exploded view of the present invention.
Figure 4:
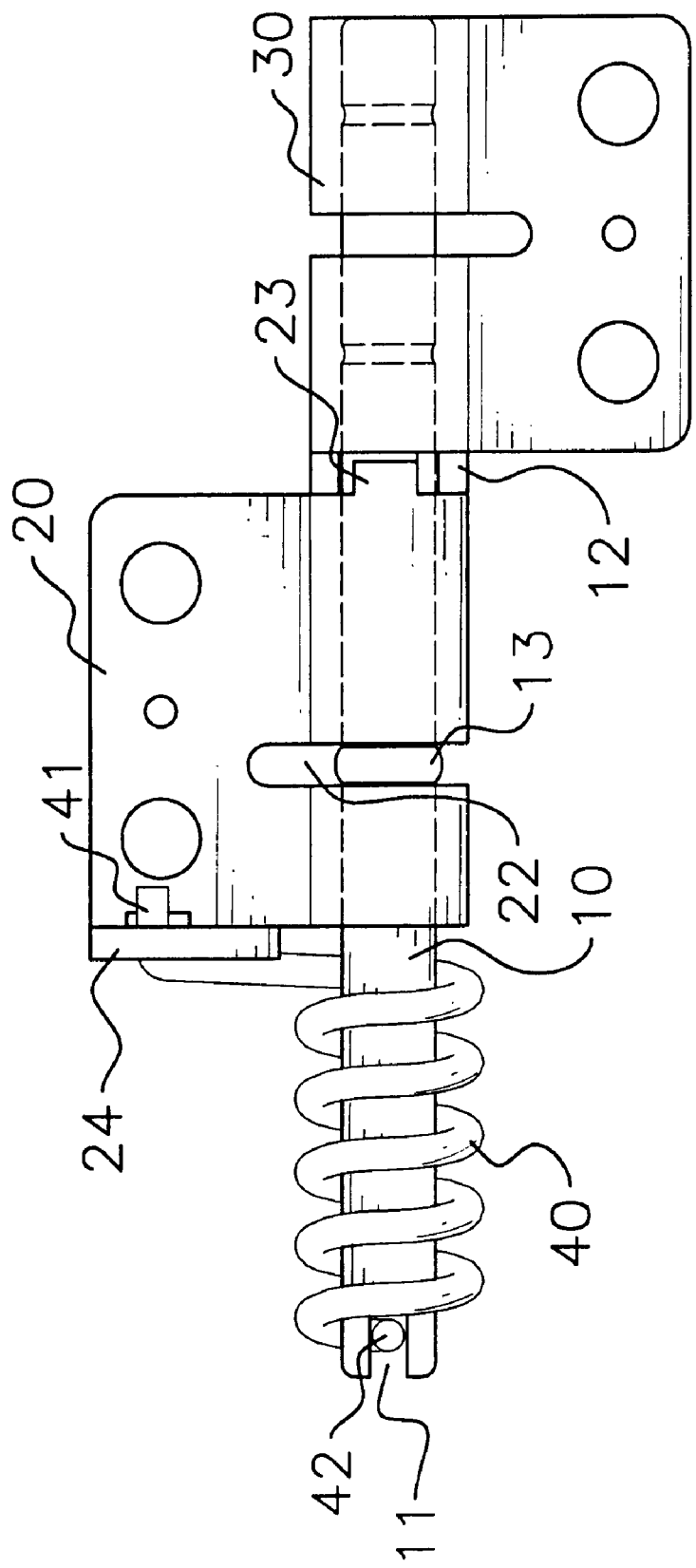
FIG. 4 is a plan view of the present invention.

With reference to FIGS. 2, 3 and 4, the shaft (10) is a long extension rod, wherein a clamp (11) is formed at one tip, a stopper ring (12) is formed around the middle section of the shaft (10) with an offset notch together forming a letter 'C' shape, and a flange (13) is formed on the same side as the offset notch. Two recesses are formed on the other side as opposed to the notch.

The rotatable bracket (20) is made up by an upward pointing planar portion and a first tube (21) through which the shaft (10) is fitted, wherein the middle section of the rotatable bracket (20) has a circumferential slot (22) cutting through the first tube (21). One end of the first tube (21) has a coupling block (23) corresponding to the notch (11) on the stopper ring (12). The planar portion has an angular corner (24) at the one end with a hole (25).

The fixed bracket (30) is also made up of a downward pointing planar portion and a second tube (31) through which the shaft (10) is fitted, wherein the middle section of the fixed bracket (30) has a slot (22) cutting through the second tube (31).

The spring (40) is mounted on one end of the rotatable bracket as opposed to the fixed bracket (30), having a first leg (41) fixed by the angular corner (24) of the rotatable bracket and a second leg (42) by the clamp (11) at the end of the shaft (10).

With reference to FIGS. 2, 3 and 4, the rotatable bracket (20) is interlocked with the shaft (10) by matting the coupling block (23) with the notch on the stopper ring (12), and the slot (22) with the flange (13) on the shaft (10), so as to prevent shifting of the rotatable bracket (20).

The fixed bracket (30) is joined by the shaft (10) extending through the second tube (31) on the other side as opposed to the rotatable bracket (20). The planar portion of the fixed bracket normally points in the opposite direction in relation to the rotatable bracket (20).

The spring (40) is installed on the same side of the shaft (10) as the rotatable bracket (20), wherein the first leg (41)

is fixed by the hole (25) in the angular corner (24) of the rotatable bracket (20), and the second leg (42) is fixed by the clamp (11) of the shaft (10).

Figure 5:
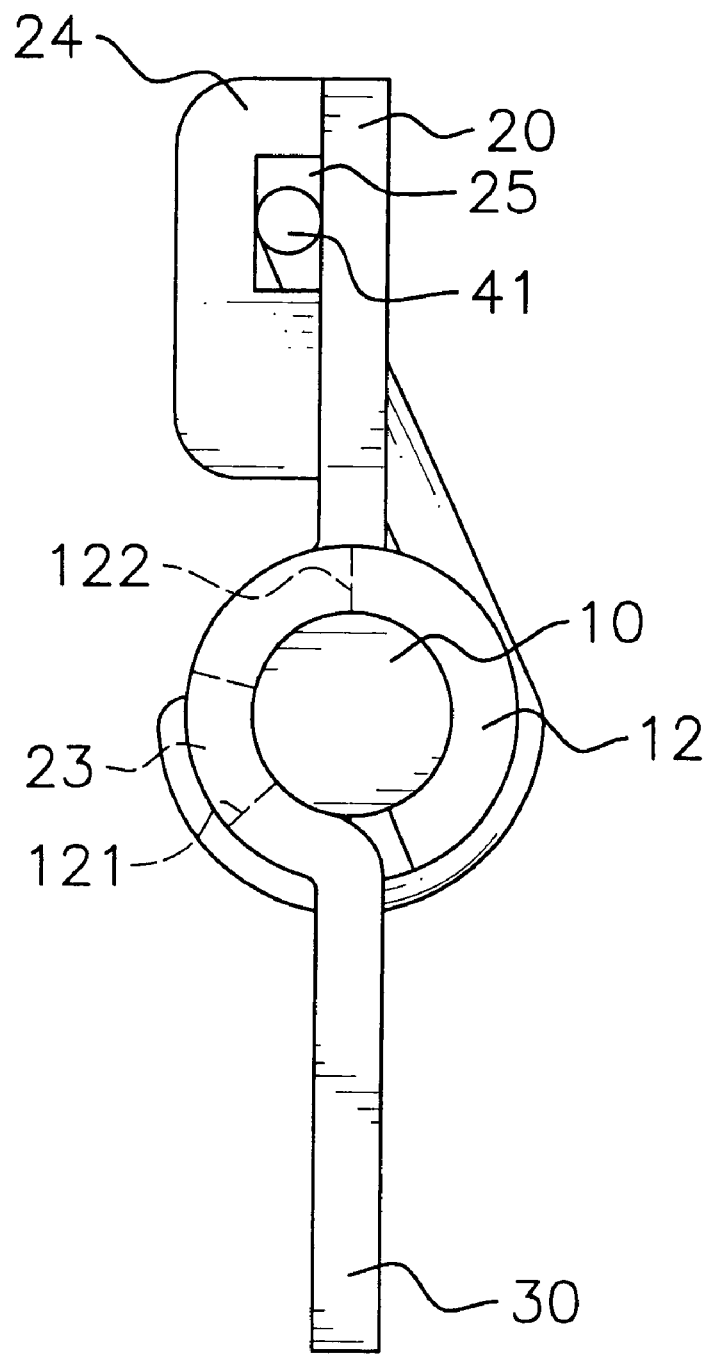
FIG. 5 is a positional diagram of the rotatable bracket of the hinge mechanism when the display panel is folded down against the computer.
Figure 8:
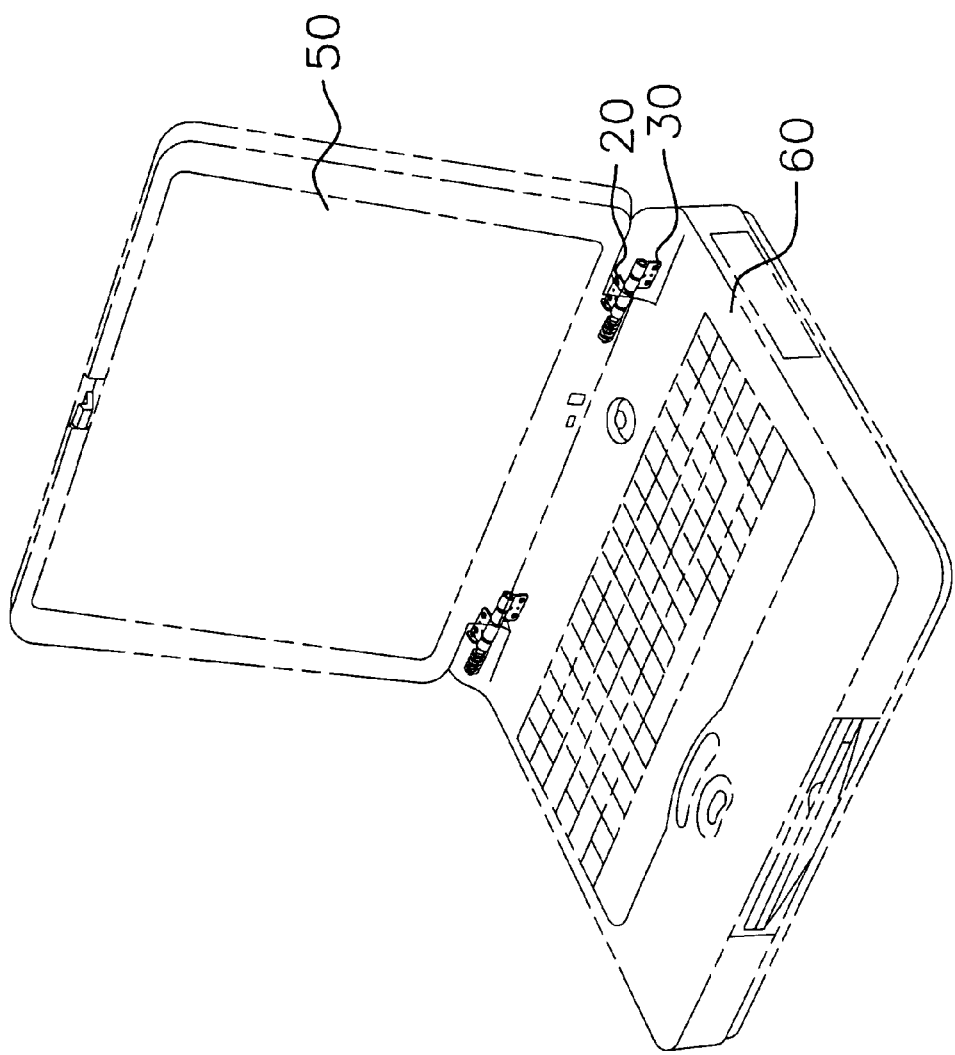
FIG. 8 is a perspective view of the hinge mechanism installed on a notebook computer.

With reference to FIGS. 4 and 8, the hinge mechanism is to be installed on the notebook computer, whereby the rotatable bracket (20) is fixed on the display panel (50) thereof, and the fixed bracket (30) is fixed on the computer body (60). The coupling block (23) on the rotatable bracket (20) is able to travel from a first position (121) to a second position (122) or vice versa in the interlocking structure of the stopper ring (12) as the display panel (50) is raised or lowered. When the display panel (50) is folded down against the computer body (60), as shown in FIG. 5, the planar portion of the rotatable bracket (20) and the planar portion of the fixed bracket (30) are in a straight line with an 180-degree angle, and the coupling block (23) is pressed against the stopper ring (12) in the first position (121). Since the coupling block (23) presses against the stopper ring (12), a torsional force is accumulated by the spring (40), which will be released once the locking device of the notebook computer is disengaged. The torsional force enables the display panel (50) to be separated from the computer body (60) with an appropriate angle as the display panel (50) is raised.

Figure 6:
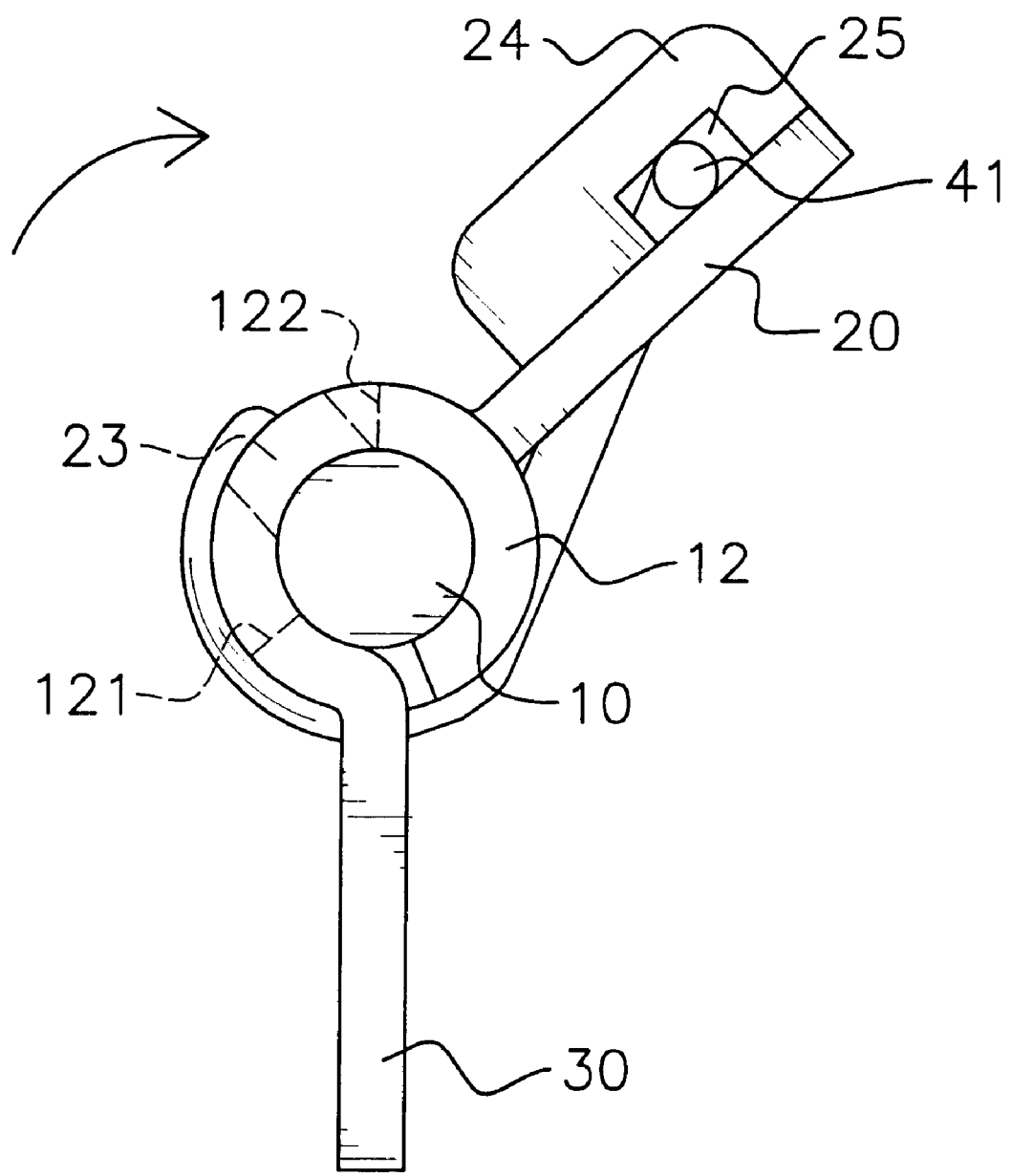
FIG. 6 is a positional diagram of the rotatable bracket when the display panel is separated from the computer body.
Figure 7:
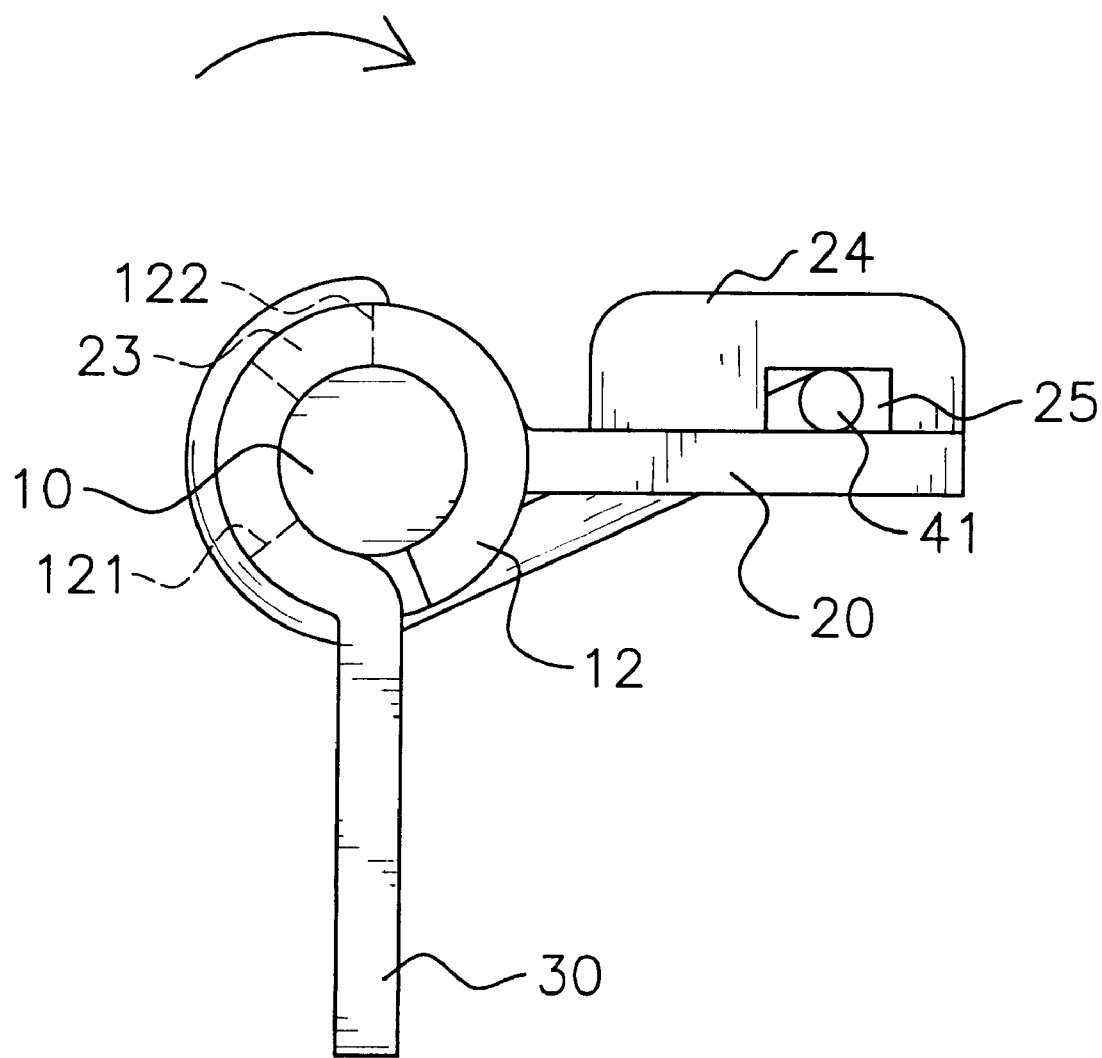
FIG. 7 is a positional diagram of the rotatable bracket when the display panel is fully opened.

When the display panel (50) is unlocked from the computer body (60), as shown in FIG. 6, the rotation of the rotatable bracket (20) enables the coupling block (23) to turn from the first position (121) to the second position (122). In the meantime, the coupling block (23) is pressed against the second position (122) of the stopper ring (12), as shown in FIGS. 7 and 8, allowing the display panel (50) to be separated from the computer body (60) at an appropriate angle. When the display panel (50) is fully raised, the included angle between the rotatable bracket (20) and the fixed bracket (30) is 90 degrees.

The modified hinge mechanism in accordance with the invention enables a computer user to open the display panel conveniently as opposed to a conventional notebook computer hinge.

The foregoing description of the preferred embodiments of the present invention is intended to be illustrative only and, under no circumstances, should the scope of the present invention be so restricted.

What is claimed is:

1. A notebook computer hinge with a spring opener, the hinge comprising:

a shaft with a stopper ring, the stopper ring having a notch defined in a middle portion thereof;

a rotatable bracket with a coupling block corresponding to the notch on the stopper ring; and a slot down the middle portion thereof;

a fixed bracket;

and a spring mounted on an outside of the rotatable bracket and supported by the shaft extending through a center of the spring, the spring having a first leg fixed on the rotatable bracket and a second leg fixed on the shaft, wherein the rotatable bracket and the fixed bracket are respectively mounted over the shaft on left and right sides of the stopper ring.

2. The notebook computer hinge with a spring opener as claimed in claim 1, wherein the shaft has a flange in the middle to be fitted against the slot on the rotatable bracket.

3. The notebook computer hinge with a spring opener as claimed in claim 2, wherein the shaft has a clamp on one end, and the rotatable bracket has an angular corner with a through hole used for anchoring the second leg of the spring.

* * * * *